United States Patent [19]

Bullock

[11] Patent Number: 5,128,052
[45] Date of Patent: Jul. 7, 1992

[54] WELLBORE LIQUID RECOVERY APPARATUS AND METHOD

[76] Inventor: Philip W. Bullock, Rte. 1A, Box 449, Dripping Springs, Tex. 78620

[21] Appl. No.: 641,482

[22] Filed: Jan. 15, 1991

[51] Int. Cl.⁵ .................... B01D 43/00; B01D 17/00
[52] U.S. Cl. .................... 210/808; 166/53; 210/97; 210/136; 210/137; 210/767; 210/923; 417/87
[58] Field of Search ............. 210/109, 117, 121, 130, 210/136, 137, 170, 242.3, 923, 97, 808, 767, 416.1; 166/53, 64, 372; 417/87, 478

[56] References Cited

U.S. PATENT DOCUMENTS

| | | | |
|---|---|---|---|
| 1,845,675 | 2/1932 | Martin | 417/87 |
| 4,273,650 | 6/1981 | Solomon | 210/104 |
| 4,469,170 | 9/1984 | Farmer, Jr. | 166/53 |
| 4,678,040 | 7/1987 | McLaughlin et al. | 166/370 |
| 4,746,423 | 5/1988 | Moyer | 210/104 |
| 4,761,225 | 8/1988 | Breslin | 210/104 |
| 4,886,432 | 12/1989 | Kimberlin | 417/478 |

Primary Examiner—Robert A. Dawson
Assistant Examiner—Sun Uk Kim
Attorney, Agent, or Firm—Shaffer & Culbertson

[57] ABSTRACT

An apparatus for recovering liquids from a wellbore includes a primary pump for pumping a primary fluid through a primary fluid conduit positioned in the wellbore, and a secondary, displacement-type pump. The displacement pump includes a recovery section and a drive section, the volume of the recovery section being adapted to vary in inverse proportion with the volume of the drive section. The secondary or displacement pump also includes an inlet arrangement with a suitable one-way valve for allowing wellbore liquid to flow into the recovery section, and an outlet arrangement adapted to carry liquid expelled from the recovery section to the surface. A venturi body is connected in the primary fluid conduit and is adapted to produce a reduced pressure at a venturi outlet as the primary pump pumps the primary fluid through the conduit and venturi body at a first flow rate and with a first pressure differential across the venturi body. A connecting line connects the venturi outlet to the drive section of the displacement pump. A flow control arrangement preferably positioned at the surface controls the flow of fluid through the primary fluid conduit to selectively apply the reduced pressure at the venturi outlet or divert fluid from the primary conduit through the venturi outlet to operate the displacement-type pump to lift fluids to the surface.

19 Claims, 2 Drawing Sheets

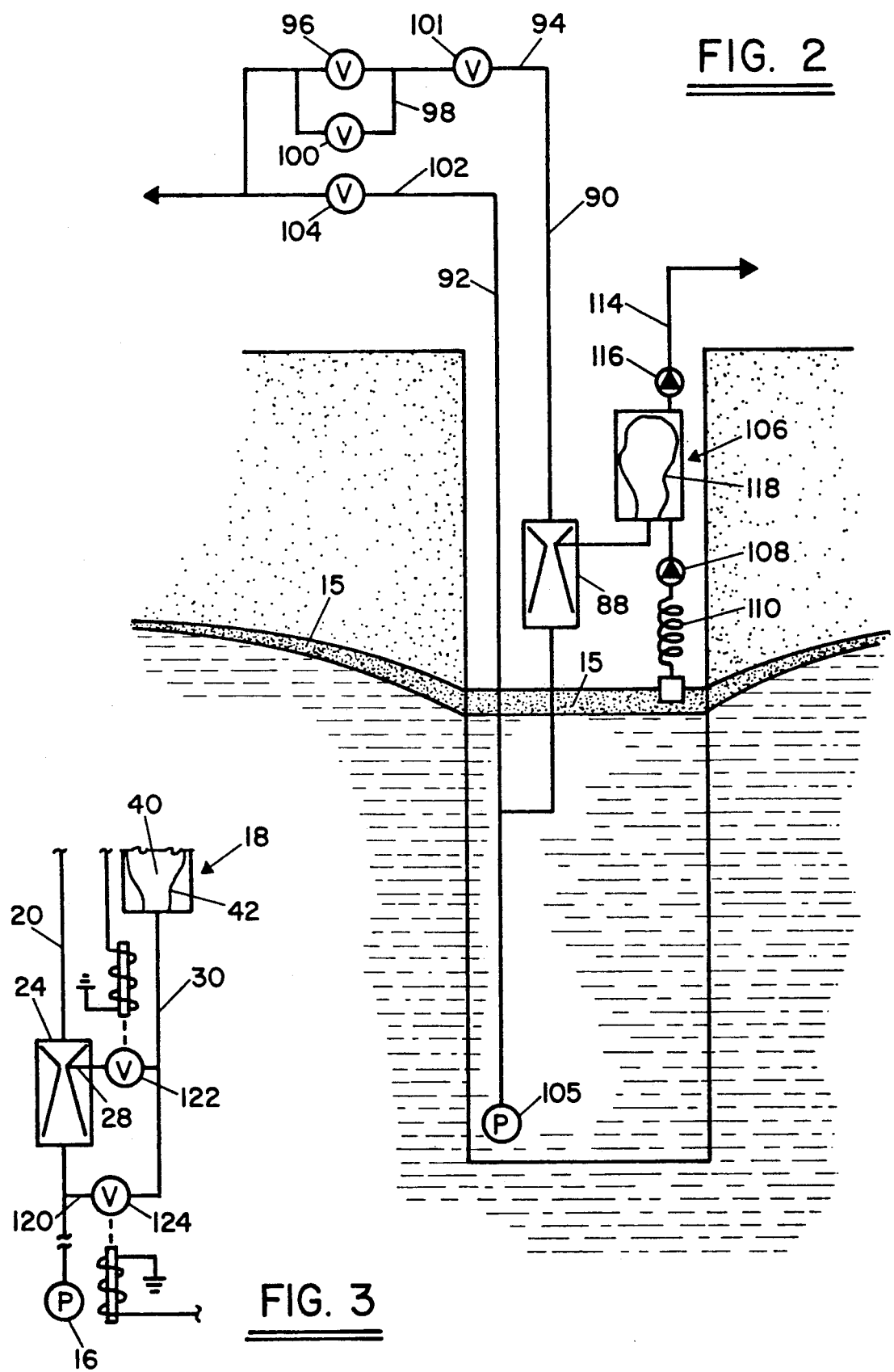

WELLBORE LIQUID RECOVERY APPARATUS AND METHOD

BACKGROUND OF THE INVENTION

This invention is directed to an apparatus and method for recovering liquids from a wellbore, and particularly, to an apparatus and method for recovering hydrocarbon contaminants from a subterranean water bearing formation.

In many cases hydrocarbon liquids that leak from surface or subsurface tanks eventually seep into underground water bearing formations. The relatively low density hydrocarbon liquids collect on top of the water in the subterranean formation and pose the risk of entering water wells or running streams in areas surrounding the point where the leak has occurred. The best way to reduce these risks and their associated health hazards is to remove the hydrocarbon liquids from the water formation, preferably before they spread from the entry area.

U.S. Pat. No. 4,273,650 to Solomon illustrates one arrangement for recovering low density contaminant liquids from a water saturated subterranean formation. Solomon uses two separate electrical submersible pumps suspended in a wellbore extending substantially into the water bearing formation, through the hydrocarbon contaminant zone. The wellbore is lined with a perforated casing that allows the hydrocarbon liquid and water to collect in the wellbore in position to be pumped to the surface by the two submersible pumps. One pump operates to continuously pump water from the wellbore at a flow rate sufficient to produce a cone of depression in the water bearing formation around the wellbore. The cone of depression increases the rate of contaminant flow into the wellbore by increasing the gradient to the wellbore. The collected contaminant liquid is pumped from the well by the second submersible pump at a relatively lower flow rate.

Although Solomon proposed using two submersible electrical pumps, other pump arrangements may include an electrical submersible pump for pumping water at the relatively high flow rate, and a lower flow rate pump such as a displacement-type pump for recovering the hydrocarbon liquid from the well. The submersible pump is well suited for removing water at relatively high flow rates and a displacement-type pump, such as a bladder pump or reciprocating piston pump, is suitable for recovering the hydrocarbon liquids at a lower rate of recovery.

Where a submersible electric pump was used to lift the collected hydrocarbon liquids, downhole level controls were required to operate the submersible pump only for short periods of time when a sufficient volume of hydrocarbon liquid had built up in the well. The submersible pumps were not capable of lifting fluid at a continuous, low flow rate. Although a displacement-type hydrocarbon recovery pump could be operated continuously at a low recovery rate, and thus eliminated the need for downhole level controls, the use of a displacement-type pump for the hydrocarbon in conjunction with a submersible electric pump for the water had its own disadvantages. Where the hydrocarbon recovery pump was a pneumatic operated pump, the recovery system required separate pneumatic control lines at the surface and in the well, an air compressor, and a motor for powering the compressor. Thus, these prior systems were expensive, and required excessive maintenance of surface power and control equipment.

SUMMARY OF THE INVENTION

It is a general object of the invention to provide an apparatus for recovering liquids from subsurface water formations that overcomes the above-described problems and other deficiencies associated with prior wellbore liquid recovery devices. Another object of the invention is to provide an improved method for recovering liquids, particularly low density contaminant liquids, from subsurface water formations.

An apparatus according to the invention includes primary pumping means for pumping or lifting a primary liquid from a well through a primary fluid recovery conduit, and a secondary pump for pumping a secondary or contaminant fluid from the well through a secondary fluid recovery conduit. The apparatus also includes pressure reduction means connected in the primary fluid conduit and flow control means for selectively diverting primary fluid to the secondary pump. The primary pumping means comprises a pump adapted to lift fluid from the well at a substantially constant first flow rate and the secondary pump comprises a displacement-type pump. The pressure reduction means preferably comprises a venturi body adapted to produce a reduced pressure in response to the flow of primary fluid through the primary fluid conduit at the first flow rate. This reduced pressure is applied to the secondary, displacement-type pump alternately with the diverted primary fluid so as to drive the secondary pump and lift the secondary fluid from the well. Thus the apparatus according to the invention utilizes the primary fluid pumped by the primary pumping means to operate the secondary pump, thereby eliminating the need for a separate power source for the secondary, displacement-type pump.

When the apparatus is used to recover hydrocarbon liquids from a water formation, the primary fluid pump preferably comprises an electrical submersible pump adapted to lift water, the primary fluid, from the well at a sufficient flow rate to produce a desired cone of depression in the water bearing formation around the wellbore. The secondary or displacement-type pump includes a pump housing having a drive section and a recovery section separated by a bladder, piston, or other means for enabling the volume of the recovery section to vary in inverse proportion to the volume of the drive section. Inlet means including an inlet check valve is connected to secondary pump housing in position to allow hydrocarbon liquids, the secondary fluid, collected in the wellbore, to enter the secondary pump recovery section. Outlet means including the secondary fluid conduit and an outlet check valve is also connected to the secondary pump recovery section.

The venturi body or pressure reduction means includes a constricted flow section and an outlet leading from the constricted flow section. A drive conduit connects the venturi outlet to the drive section of the secondary pump housing. Thus the pressure at the outlet of the venturi body may be applied directly to the secondary pump drive section.

The preferred flow control means includes a surface valve arrangement for controlling the pressure differential across the venturi body connected downhole in the primary fluid conduit. The surface valve arrangement includes a discharge line connected to the primary conduit and a cut-off valve connected in the discharge line.

A bypass line is connected to the discharge line in position to bypass the cut-off valve and an adjustable bypass valve and pressure gauge are connected in the bypass line.

This preferred flow control means has two states of operation. In a first state of operation the cut-off valve is open so as to allow the primary fluid pumped by the primary pump to flow freely from the well at the first flow rate. This first flow rate produces a sufficient pressure differential across the venturi body to produce a desired reduced pressure at the venturi outlet. The reduced pressure is applied to the drive section of the secondary, displacement-type pump to reduce the volume of the drive section and thereby increase the volume of the recovery section, allowing secondary fluid to flow into the recovery section through the secondary pump inlet means. Once the recovery section is expanded to its greatest possible volume and is full of secondary liquid, the cut-off valve is closed to direct all output from the primary conduit through the bypass line and the adjustable bypass valve. The adjustable bypass valve is adjusted to decrease the pressure differential across the downhole venturi body and thereby produce an increased pressure at the venturi outlet port. This increased pressure diverts fluid from the primary fluid conduit through the drive conduit and into the drive section of the secondary pump to expand the drive section. As the drive section expands it expels secondary fluid previously drawn into the recovery section and lifts the secondary fluid from the well through the secondary fluid conduit.

In the preferred form of the invention the apparatus also includes a return line connected in the surface discharge line in position to return a desired volume of the first primary fluid to the well. This allows the primary pump to lift primary fluid through the primary conduit at the first flow rate to produce the desired reduced pressure at the venturi outlet while maintaining a lower water production rate from the well sufficient to produce the desired cone of depression in the water formation.

An alternate flow control means includes surface controlled downhole valves connected to supply the desired pressure to the drive section of the secondary pump. This alternate downhole valve flow control means includes a separate lift conduit connected between the secondary pump drive section and the primary fluid conduit, a surface controlled lift valve positioned in the lift conduit, and a surface controlled valve connected in the drive conduit. These two valves are alternately opened and closed to alternately supply the desired reduced pressure and primary fluid pressure to operate the secondary, displacement-type pump.

Although the wellbore liquid recovery apparatus according to the invention is particularly well suited for applications in which the primary fluid is a fluid being recovered from the well, those skilled in the art will readily appreciate that the primary fluid need not be a fluid produced or recovered from the well. The primary fluid can be supplied from the surface and pumped from the surface to the downhole venturi body through a suitable conduit. The primary fluid would then be returned to the surface through the primary fluid conduit and eventually recycled downhole to drive the displacement pump through the venturi body.

The method of the invention and the operation of the apparatus described above includes first pumping the primary fluid through the primary fluid conduit in the wellbore to create a reduced pressure at the downhole venturi body and then applying the reduced pressure to fill the secondary, displacement-type pump with secondary fluid. Next, the method includes diverting primary fluid from the primary fluid conduit to the drive section of the displacement-type pump to expel liquid previously collected in the secondary pump. The method of the invention may also include returning primary fluid to the well in order to maintain the desired first flow rate through the primary fluid conduit and venturi body while recovering the primary fluid from the well at a lower optimum rate for producing the desired cone of depression in the formation.

These and other objects, advantages, and features of the invention will be apparent from the following description of the preferred embodiments, considered along with the accompanying drawings.

BRIEF DESCRIPTION OF THE DRAWINGS

FIG. 2 is a diagrammatic view in partial longitudinal section showing an alternate wellbore liquid recovery apparatus embodying the principles of the invention.

FIG. 3 is a partial diagrammatic view showing an alternate flow control means for the apparatus embodying the principles of the invention.

DESCRIPTION OF THE PREFERRED EMBODIMENTS

Figure 1:
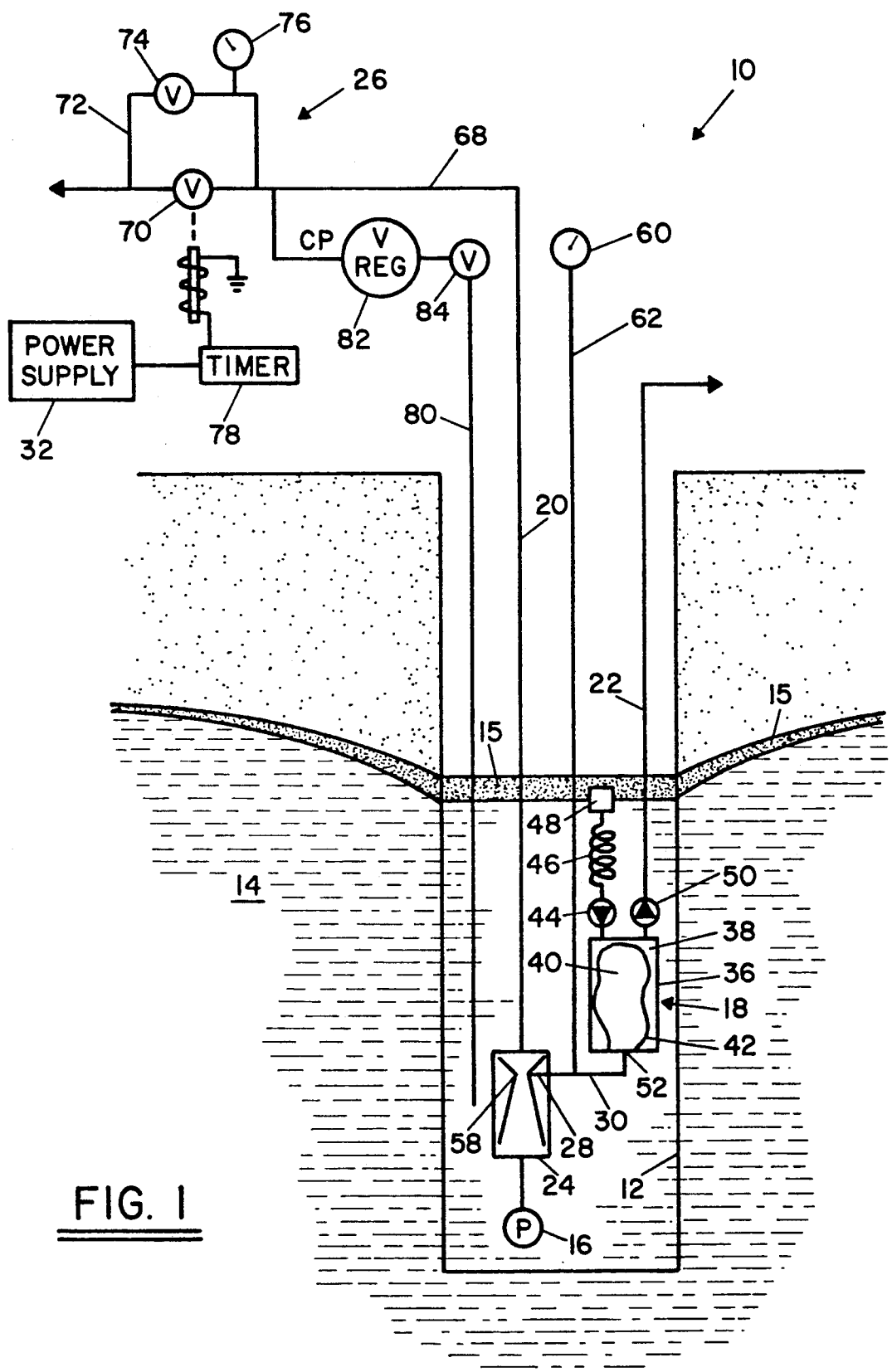
FIG. 1 is diagrammatic view in partial longitudinal section showing a wellbore liquid recovery apparatus embodying the principles of the invention.

FIG. 1 shows a wellbore liquid recovery apparatus 10 embodying the principles of the invention. The apparatus 10 is particularly adapted for recovering water and a hydrocarbon or other low density liquid pollutant or contaminant from a water remediation well generally indicated at reference numeral 12. The well 12 extends from the surface substantially into a water bearing formation 14 having a distinct hydrocarbon liquid phase 15 collected in the formation above the water level. The well 12 would normally be lined or cased with a perforated casing (not shown) having perforations in the length traversing the water bearing formation enabling the formation fluids to enter and collect in the well to be recovered by apparatus 10.

The preferred apparatus 10 shown in FIG. 1 includes primary pumping means comprising pump 16 and a secondary pump 18. The primary pump 16 is adapted to lift a primary fluid, in this case water, from the well 12 through a primary fluid conduit 20 at a first flow rate. The secondary pump 18 is adapted to lift a secondary fluid, in this case the collected hydrocarbon liquid 15, to the surface through a secondary fluid conduit 22. Pressure reduction means 24 and flow control means indicated at reference numeral 26 are also included in the apparatus 10. The pressure reduction means 24 is connected in the primary fluid conduit 20 and has a outlet port 28 connected to the secondary pump 18 through drive conduit 30. The flow control means 26 is adapted to control the flow of primary fluid through the primary fluid conduit 20 and the pressure reduction means 24 to alternately produce a reduced pressure or increased pressure at the port 28. This alternating pressure is applied through the drive conduit 30 to operate the secondary pump to lift the hydrocarbon liquid 15 to the surface.

The primary pump 16 in this preferred form of the invention comprises an electric submersible pump powered through an electric power supply 32 at the surface. The electrical connection to the pump 16 is not shown in FIG. 1 although those skilled in the art will readily appreciate that such a connection is required to operate the pump. Submersible pumps are well suited for lifting fluids from a well at a flow rate required in this preferred form of the invention.

The secondary pump 18 comprises a suitable displacement-type pump having a housing 36 separated into a recovery section 38 and a drive section 40 preferably by an expandable bladder 42. Inlet means comprising an inlet check valve 44, a length of flexible coil tubing 46, and an inlet float 48 are connected to feed hydrocarbon liquid 15 collected in the well 12 to the recovery section 38 of the secondary pump housing 36. The inlet float 48 is adapted to float at the water/hydrocarbon interface in the well 12 and acts to skim hydrocarbon liquid into the secondary pump housing 36. Outlet means for carrying the hydrocarbon liquid 15 from the secondary pump 18 to the surface includes the secondary fluid conduit 22 and an outlet check valve 50 connected to prevent back 1 flow from the conduit into the pump housing 36. The bladder pump also includes a drive port 52 extending into the drive section 40 of the pump and connected to the outlet 28 of the pressure reduction means 24 through the drive conduit 30.

The pressure reduction means 24 preferably comprises a venturi body having a constricted section indicated schematically at reference numeral 58. The outlet or port 28 opens into this constricted section. The constricted section 58 is sized, as is well known in the art, to produce a desired reduced pressure at the venturi outlet 28 in response to the flow of primary fluid through the primary fluid conduit 20 and venturi body 24 at the first flow rate and at a desired pressure differential across the venturi body. The pressure at the venturi outlet 28 is preferably monitored by a surface gauge 60 connected to the drive conduit by a suitable small diameter tubing 62. In alternate forms of the invention, a downhole pressure sensor connected to a suitable readout device at the surface may be employed for monitoring the pressure in the drive conduit 30.

The preferred flow control means 26 shown in FIG. 1 includes a surface discharge line 68 connected to the primary fluid conduit, and a control valve arrangement. The surface valve arrangement includes a cut-off valve 70, preferably a solenoid operated valve, connected in the discharge line 68 and adapted to either reside in a fully open position or a fully closed position. A bypass line 72 is connected to the primary fluid discharge line 68 in position to bypass the solenoid operated cut-off valve 70. An adjustable valve 74 and a pressure gauge 76 are connected in the bypass line 72. As shown in FIG. 1, the preferred solenoid operated cut-off valve 70 is connected to a timer 78 for selectively energizing the solenoid to control the condition of the valve. The timer 78 may be operated through the same electrical power source 32 used to operate the submersible primary pump 16.

In operation, the primary pump 16 is operated to pump primary fluid through the primary fluid conduit 20 at the first flow rate when the cut-off valve 70 is open. In this form of the invention the primary fluid is water collected in the well and the first flow rate is a rate capable of producing a cone of depression in the water bearing formation around the well 12. The flow of primary fluid through the venturi body 24 at the first flow rate produces a reduced pressure at the venturi outlet 28 of the venturi body. This reduced pressure is applied through the drive conduit 30, and drive port 52 to the drive section 40 of the secondary pump 18 defined within the bladder 42. The reduced pressure applied to the secondary pump bladder 42 contracts the bladder to increase the volume of the pump recovery section 38 which fills with hydrocarbon liquid entering through the inlet float 48, coil tubing 46, and inlet check valve 44.

In order to expel the hydrocarbon liquid received in the secondary pump recovery section 38, a portion of the primary fluid from the primary fluid conduit 20 is diverted through the venturi outlet 28 to the bladder 42 to expand the bladder. As the bladder expands it forces the collected hydrocarbon liquid previously collected in the pump recovery section 38 to the surface through the conduit 22 and outlet check valve 50. In the preferred form of the invention shown in FIG. 1, this step of diverting primary fluid from the primary fluid conduit 20 includes closing the cut-off valve 70 to direct all of the primary fluid through the bypass line 72 and the adjustable bypass valve 74. The adjustable bypass valve 74 is adjusted to provide a back pressure sufficient to decrease the pressure differential across the venturi body 24 to a point at which primary fluid flows through the venturi outlet 28, drive conduit 30, and drive port 52 to expand the bladder 42 of the secondary pump 18 at a pressure required to lift the hydrocarbon liquid to the surface. Primary fluid is diverted to the secondary pump bladder 42 until the bladder expands to take up substantially the entire volume of the pump housing 42. This maximum bladder expansion can be monitored at the surface by monitoring the output from the secondary fluid conduit 22. Also, the pressure condition in the drive conduit 30 is monitored by the gauge 60 connected to the drive conduit.

In the form of the invention shown in FIG. 1 the cut-off valve 70 is solenoid operated and the solenoid is energized periodically using the timer 78. The timer is set to open the cut-off valve 70 for a sufficient period to fully contract the secondary pump bladder 42 with the reduced pressure produced at the venturi body 24, and then close the cut-off valve for a sufficient period of time to fully expand the bladder.

The apparatus shown in FIG. 1 also includes primary fluid return means comprising a return conduit 80 connected to the discharge line 68, an adjustable constant pressure regulator valve 82, and an adjustable return valve 84. The primary fluid return means operates to maintain a water production rate necessary to produce an optimum cone of depression in the reservoir around the well 12 even though a higher flow rate is required through the venturi body 24 to produce the desired reduced pressure at the venturi outlet 28. Thus the primary fluid return means eliminates the need to size the venturi body for each particular well. The pressure regulator valve 82 is set to return primary fluid, water, to the well from the discharge line 68 at a constant pressure adapted to maintain the desired water production rate. Because a portion of the lifted water is returned to the well, the flow rate through the venturi body 24 necessary to produce the desired reduced pressure at the venturi outlet 28 may be a flow rate higher than that flow rate corresponding to the optimum water production rate.

FIG. 2 shows an alternate form of the invention in which a venturi body 88 is connected in a branch line 90 from a primary fluid conduit 92. The branch conduit or line 90 is connected to a branch discharge line 94 with a solenoid operated cut-off valve 96, bypass line 98, and bypass valve 100 similar to the flow control means shown in FIG. 1. The branch discharge line 94 also includes a valve 101 for closing off the branch lines 90 and 94 entirely. The main primary fluid conduit 92 is connected to the main surface discharge line 102 that includes a main line flow/pressure adjustment valve 104. This alternate embodiment allows adjustment of flow through the primary fluid conduit 92 without affecting the discharge side of the branch conduit 90 in which the venturi body 88 is connected. Also, the volume of flow required through the venturi body 88 may be reduced in this alternate embodiment of the invention. The surface valves 96 and 100, however, operate similarly to the valves 70 and 74 in FIG. 1 to produce the desired pressure at the venturi body 88.

A primary pump 105 in FIG. 2 operates to lift the primary fluid, water, from the well similarly to the pump 16 shown in FIG. 1. The embodiment in FIG. 2 also includes a secondary, bladder-type pump 106 similar to the pump 18 in FIG. 1, although the pump 106 shown in FIG. 2 is positioned above the level of the secondary fluid or hydrocarbon contaminant 15 in the well. In this case the secondary fluid inlet means comprising an inlet check valve 108, a length of coil tubing 110, and the inlet float 112, depends from the secondary pump 106. A secondary fluid outlet line 114 with the outlet check valve 116 is similar to the embodiment shown in FIG. 1. This alternate placement of the displacement-type pump 106 and secondary fluid inlet means relies entirely on the contraction of the bladder 118 to draw hydrocarbon liquid into the lift section of the pump. This is in contrast to the embodiment shown in FIG. 1 in which the hydrocarbon liquid or other secondary fluid 15 reaches the secondary pump 18 through gravity drainage along with the drawing force provided as the bladder 42 contracts.

The alternate flow control means of the invention shown in FIG. 3 includes a downhole control valve arrangement in contrast to the surface valve arrangements shown in FIGS. 1 and 2. The downhole flow control means shown in FIG. 3 serves to alternately apply the desired reduced pressure from the venturi body 24 to the drive section 40 of the secondary pump 18, or divert primary fluid from the primary fluid conduit 20 similarly to the embodiment shown in FIGS. 1. A remote or surface controlled venturi outlet valve 122 is connected in the drive conduit 30 while a surface controlled lift valve 124 is connected in a lift conduit 120. The lift conduit extends between the primary fluid conduit 20 and the drive conduit 30. The desired pressure applied to the secondary pump drive section 40 is controlled by alternately opening and closing the remote controlled valves 122 and 124 while the submersible pump 16 lifts primary fluid from the well through the primary fluid conduit 20 and venturi body 24.

In operation of the flow control means shown in FIG. 3, the submersible pump 16 pumps primary fluid through the conduit 20 and venturi body 24 at a flow rate sufficient to produce a reduced pressure at the venturi outlet 28. Simultaneously, the pump 16 applies a higher lift pressure to lift conduit 120. To contract the bladder 42 of the secondary pump 18, the lift valve 124 is closed from the surface and the venturi outlet valve 122 is opened so as to apply the reduced pressure to the secondary pump bladder. Once the secondary pump bladder 42 is fully collapsed, the venturi outlet valve 122 is closed from the surface and the lift valve 124 is opened to divert primary fluid under the lift pressure to the secondary pump bladder. This pressure expands the bladder 42 and expels hydrocarbon liquid from the secondary pump housing as described above with reference to FIG. 1. As shown in FIG. 3 the lift and venturi outlet valves are both solenoid operated valves and may be operated from a common power source such as the source 32 in FIG. 1 also used to drive the submersible pump 16. Alternatively, the lift and venturi outlet valves 124 and 122, respectively, may be operated by any other means suitable for operating the valves downhole.

The above described preferred embodiments are intended to illustrate the principles of the invention, but not to limit the scope of the invention. Various other embodiments and modifications to these preferred embodiments may be made by those skilled in the art without departing from the scope of the following claims. For example, although a bladder pump is shown in the drawings as the preferred displacement-type pump employed as the secondary pump 18, those skilled in the art will readily appreciate that other types of displacement pumps may be employed in the invention. Also, any suitable valves may be used to provide the various cut-off or flow adjusting functions described above. Furthermore, the primary fluid may be a fluid supplied from the surface to the downhole venturi body rather than a fluid actually recovered from the well. In this case the primary fluid pump may be positioned at the surface and connected to pump the primary fluid to the venturi body through a separate conduit.

I claim:

1. An apparatus for recovering liquids from a wellbore, the apparatus comprising:
  (a) primary pumping means for pumping a primary fluid at a first flow rate through a primary fluid conduit extending through the wellbore;
  (b) a secondary pump housing having a recovery section and a drive section, the volume of the recovery section being adapted to vary in inverse proportion with the volume of the drive section;
  (c) secondary pump inlet means connected to the secondary pump housing for enabling liquid to flow from the wellbore into the recovery section of the secondary pump housing while preventing liquid from returning from the recovery section to the wellbore;
  (d) secondary pump outlet means connected to the secondary pump housing for carrying liquid expelled from the recovery section of the secondary pump housing to the surface while preventing the expelled liquid from returning to the recovery section;
  (e) pressure reduction means connected to the primary fluid conduit for producing a reduced pressure at an outlet in said pressure reduction means in response to the primary fluid flowing through the pressure reduction means at the first flow rate, with a first pressure differential across the pressure reduction means;
  (f) a drive conduit connected between the pressure reduction means outlet and a drive port to the drive section of the secondary pump housing, the drive conduit enabling the reduced pressure produced at the pressure reduction means outlet to be applied to the drive section;

(g) flow control means connected to the primary fluid conduit for selectively diverting primary fluid pumped by the primary pumping means to the drive section of the secondary pump housing to increase the volume of the drive section and expel liquid collected in the recovery section to the secondary pump outlet means; and (h) control valve means included in the flow control means and connected to the primary fluid conduit for reducing the pressure differential across the pressure reduction means below the first pressure differential and thereby increasing the pressure at the outlet of the pressure reduction means.

2. The apparatus of claim 1 wherein the control valve means includes:

(a) a primary fluid discharge line connected to the primary fluid conduit;

(b) a solenoid operated cut-off valve connected in the primary fluid discharge line;

(c) a bypass line connected to the discharge line so as to bypass the solenoid operated valve;

(d) an adjustable valve connected in the bypass conduit; and (e) a pressure gauge connected in the bypass line so as to read the pressure in the bypass line between the adjustable valve and the solenoid operated cut-off valve.

3. The apparatus of claim 1 wherein:

(a) the primary pumping means is a down hole pump positioned in the wellbore so as to pump fluid from the wellbore upwardly through the primary fluid conduit and the pressure reduction means connected therein;

(b) the primary fluid line extends to the surface; and (c) the control valve means is positioned at the surface.

4. The apparatus of claim 1 wherein the pressure reduction means includes:

(a) a venturi body mounted in the primary fluid conduit within the wellbore; and (b) a constricted flow area within the venturi body, in which constricted flow area the pressure reduction means outlet is positioned.

5. The apparatus of claim 4 including:

(a) a pressure gauge connected to the drive conduit indicating the absolute pressure in the drive conduit.

6. The apparatus of claim 4 further including:

(a) a return conduit connected to the primary fluid conduit between the control valve means and the venturi body, the return line leading back to the wellbore; and (b) return pressure regulating means for returning a volume of fluid from the primary fluid conduit to the wellbore through the return line to maintain a desired operating pressure at the primary fluid conduit and the return conduit connection.

7. An apparatus for recovering liquids from a wellbore, the apparatus comprising:

(a) primary pumping means for pumping a primary liquid at a first flow rate through a primary conduit extending through the wellbore;

(b) a secondary pump housing having a recovery section and a drive section, the volume of the recovery section being adapted to vary in inverse proportion with the volume of the drive section;

(c) secondary pump inlet means connected to the secondary pump housing for enabling liquid to flow from the wellbore into the recovery section of the secondary pump housing while preventing liquid from returning from the recovery section to the wellbore;

(d) secondary pump outlet means connected to the secondary pump housing for carrying liquid expelled from the recovery section of the secondary pump housing to the surface while preventing the expelled liquid from returning to the recovery section;

(e) pressure reduction means connected to the primary conduit for producing a reduced pressure at an outlet in said pressure reduction means in response to the primary liquid flowing through the pressure reduction means at the first flow rate, with a first pressure differential across the pressure reduction means;

(f) a drive conduit connected between the pressure reduction means outlet and a drive port to the drive section of the secondary pump housing, the drive conduit enabling primary liquid under the reduced pressure to be applied to the drive section; and (g) flow control means connected to the primary conduit for selectively diverting primary liquid pumped by the primary pumping means to the drive section of the secondary pump housing to increase the volume of the drive section and expel liquid collected in the recovery section to the secondary pump outlet means.

8. The apparatus of claim 7 wherein the control valve means includes:

(a) a lift pressure conduit connected to the primary conduit;

(b) a lift pressure remote controlled valve connected in the lift pressure conduit; and (c) a pressure reduction remote controlled valve connected in the drive conduit between the pressure reduction means and the lift pressure conduit, the pressure reduction remote controlled valve being adapted to remain open when the lift pressure remote controlled valve is closed and being adapted to remain closed when the lift pressure remote controlled valve is open.

9. The apparatus of claim 8 wherein the pressure reduction means includes:

(a) a venturi body mounted in the primary conduit within the wellbore; and (b) a constricted flow area in the venturi body in which the pressure reduction means outlet is formed.

10. An apparatus for recovering liquids from a wellbore, the apparatus comprising:

(a) a primary pump positioned in the wellbore and connected for pumping a primary wellbore liquid from the wellbore to the surface through a primary conduit at a first flow rate;

(b) a secondary pump housing having a recovery section and a drive section, the volume of the recovery section being adapted to vary in inverse proportion with the volume of the drive section;

(c) secondary pump inlet means connected to the secondary pump housing for enabling liquid to flow from the wellbore into the recovery section of the secondary pump housing while preventing liquid from returning from the recovery section to the wellbore;

(d) secondary pump outlet means connected to the secondary pump housing for carrying liquid expelled from the recovery section of the secondary pump housing to the surface while preventing the expelled liquid from returning to the recovery section;

(e) a venturi body connected in the primary conduit in the wellbore and having a venturi outlet;

(f) a drive conduit connected between the venturi outlet and a drive port to the drive section of the secondary pump housing; and (g) flow control means connected to the primary conduit for selectively diverting a portion of the primary wellbore liquid pumped by the primary pump to the drive section of the secondary pump housing to increase the volume of the drive section and expel liquid collected in the recovery section to the secondary pump outlet means.

11. The apparatus of claim 10 wherein the flow control means includes:

(a) a discharge conduit connected to the primary conduit at the surface;

(b) a flow cut-off valve connected in the discharge conduit;

(c) a bypass conduit connected to the discharge conduit so as to bypass the cut-off valve;

(d) an adjustable valve connected in the bypass conduit; and (e) a pressure gauge connected to read the pressure in the bypass conduit between the adjustable valve and the cut-off valve.

12. The apparatus of claim 10 wherein the flow control means includes:

(a) a lift pressure conduit connected between the drive conduit and the primary conduit;

(b) a lift pressure remote controlled valve connected in the lift pressure conduit and adapted to be controlled from the surface; and (c) a venturi outlet remote controlled valve connected in the drive conduit between lift pressure conduit and the venturi body and adapted to be controlled from the surface.

13. A method for recovering liquids from a wellbore with a displacement pump positioned in the wellbore and comprising a pump housing divided into a recovery section and a drive section, the recovery section being adapted to receive liquid from the wellbore through a one-way inlet port and to expel liquid through a one-way outlet port, and the drive section being adapted to vary in volume in inverse proportion to the volume of the recovery section, the method comprising the steps of:

(a) pumping a primary fluid at a first flow rate through a primary conduit extending through the wellbore and a venturi body mounted in the wellbore on the primary conduit, the flow of fluid through the venturi body at the first flow rate producing a reduced pressure at a venturi outlet in the venturi body;

(b) applying the reduced pressure produced at the venturi outlet to the displacement pump drive section, the reduced pressure being less in magnitude than the pressure exerted by the wellbore liquid on the displacement pump recovery section through the inlet port such that the pump drive section volume decreases in response to said applied reduced pressure;

(c) filling the recovery section of the displacement pump with a liquid from the wellbore as the volume of the drive section decreases; and (d) diverting a portion of the primary fluid from the primary conduit to the drive section of the displacement pump to expand the drive section and thereby displace the liquid in the recovery section through the outlet port and a recovery conduit connected thereto.

14. The method of claim 13 including the steps of:

(a) removing the pressure of the primary fluid diverted from the primary conduit to the pump drive section; and (b) again applying the reduced pressure from the venturi outlet to the pump drive section to decrease the volume of the pump drive section and thereby increase the volume of the pump recovery section.

15. The method of claim 13 wherein the primary fluid is a liquid flowing into the wellbore from a subterranean water bearing formation.

16. The method of claim 15 wherein the primary fluid is produced at a rate sufficient to produce a cone of depression in the water bearing formation around the wellbore.

17. The method of claim 13 wherein the step of diverting a portion of the primary fluid to the displacement pump drive section includes increasing a discharge pressure from the venturi body to increase the pressure at the venturi outlet.

18. The method of claim 17 further including the step of:

(a) returning a portion of the primary fluid from the primary conduit to the wellbore in order to simultaneously maintain the first flow rate through the primary conduit and a lower primary fluid recovery rate.

19. The method of claim 13 wherein the step of diverting a portion of the primary fluid to the displacement pump drive section comprises the steps of:

(a) blocking the venturi outlet; and (b) diverting a portion of the primary fluid from the primary conduit to the displacement pump drive section while the venturi outlet is blocked.

* * * * *